United States Patent [19]
Nystrom

[11] Patent Number: 5,746,039
[45] Date of Patent: May 5, 1998

[54] TRUSS FASTENER AND TRUSS ASSEMBLY

[75] Inventor: Robert G. Nystrom, Glastonbury, Conn.

[73] Assignee: Metaltite Corporation, West Hartford, Conn.

[21] Appl. No.: 658,845

[22] Filed: May 31, 1996

[51] Int. Cl.[6] .................................................. E04B 1/32
[52] U.S. Cl. ........................... 52/639; 52/696; 411/387; 411/412
[58] Field of Search .................... 52/634, 639, 690, 52/691, 692, 696, 697; 411/387, 412, 413, 399

[56] References Cited

U.S. PATENT DOCUMENTS 3,524,378  8/1970  Wieber ............................. 411/387
5,463,837  11/1995  Dry ................................... 52/634 X

*Primary Examiner*—Creighton Smith
*Attorney, Agent, or Firm*—Alix, Yale & Ristas, LLP

[57] ABSTRACT

A truss fastener for fastening a chord to a tubular member comprises a head and a shank extending from the underside of the head and terminating at a self-drilling distal tip. The shank comprises proximal and distal portions, each having a spiral buttress thread, that are separated by an unthreaded shaft portion. The length $L_1$ of the self-drilling tip and the distal, shaft and proximal portions of the shank $L_2$, $L_3$, $L_4$ are selected such that $L_2+L_3$ is greater than the diameter of the tubular member cavity, $L_1+L_2$ is less than the diameter of the tubular member cavity, and $L_2$ and $L_3$ are each greater than the total of the thickness $T_1$ of the wall of the tubular member and the thickness $T_2$ of the wall of the chord $T_1+T_2$. Preferably $L_4$ is also greater than $T_1+T_2$. During installation, the shaft portion freely rotates within the entrance holes in the chord and tubular member as the self-drilling tip drills the exit holes. The buttress thread on both the distal and proximal portions of the shank engages the chord and tubular member to clamp the tubular member within the chord.

16 Claims, 4 Drawing Sheets

TRUSS FASTENER AND TRUSS ASSEMBLY

BACKGROUND OF THE INVENTION

This invention relates generally to fasteners which are employed to fasten truss assemblies. More particularly, the present invention relates to fasteners which are employed for fastening an end portion of a rectangular tube inside a chord to form a truss assembly.

Truss assemblies for which the invention has particular applicability comprise a plurality of preformed light gauge steel chords each having a channel into which is inserted the end portions of a plurality of rectangular tubes. Typically each tube is attached to a chord with a conventional self-drilling, self-tapping screw. The screw is installed by positioning the self-drilling point against a surface of the chord and rotating the screw such that the drill point drills entrance holes in the joined chord and tube. Following penetration by the drill point, the screw thread engages the chord and tube in the areas of the entrance hole, and the screw is advanced through the hollow interior of the chord and tube by action of the thread at a rate governed by the lead of the thread.

As the drill point engages the opposite wall of the tube and begins to drill the exit hole, the speed of advance of the screw is reduced due to the drilling action. Since the screw does not advance as far for each rotation of the screw, the screw thread strips the thread that had been formed in the entrance hole. Removal of the thread material increases the diameter of the entrance hole to the tip diameter of the screw thread. Consequently, the screw thread engages the chord and tube for effective fastening only in the zone of the exit hole when the screw is fully installed. This limited fastening engagement reduces the holding power of the screw.

SUMMARY OF THE INVENTION

Briefly stated, the invention in a preferred form is a double shear truss fastener for securely joining a low gauge metallic tubular member to a low gauge metallic chord to form a truss frame. The fastener is a double shear screw which comprises a head having a top portion and a shank extending from the underside of the head at a proximal end and terminating at a distal tip. Self-drilling means, such as flutes, are provided adjacent the tip for drilling entrance and exit holes in the chord and tubular member. The shank comprises proximal and distal portions each having a spiral buttress thread for engaging the walls of the chord and tubular member adjacent the entrance and exit holes to clamp the tubular member in the chord. An unthreaded shaft portion is disposed intermediate the proximal and distal portions to allow the fastener to rotate at a slower speed while the exit holes are being drilled without stripping the thread formed in the entrance hole.

More particularly, the length of the distal and unthreaded shaft portions of the shank is selected such that the total length of these portions is greater than the diameter of the tubular member cavity. Consequently, the distal end of the buttress thread on the proximal portion of the shank does not engage the exterior surface of the chord until the drill tip has completed drilling the exit holes in the tubular member and chord. While the drill tip is drilling the exit holes, the unthreaded shaft portion of the shank is positioned in the entrance holes in the tubular member and chord. The diameter of the unthreaded shaft portion is equal to or smaller than the root diameter of the distal and proximal portions of the shank. Consequently, the unthreaded shaft portion rotates freely within the entrance holes and does not strip the thread formed in the wall of the entrance holes.

It is an object of the present invention to provide a new and improved truss fastener for securely fastening a tubular member to a chord, and in particular, for fastening a tubular member to a chord by engaging the opposite walls of the tubular member and chord to provide an effective dual fastening zone.

It is a further object of the invention to provide a truss fastener of superior fastening integrity, which may be rotated at a first speed for drilling entrance and exit holes into the opposite walls of the tubular member and chord and at a second speed for advancing the fastener through the hollow interior of the tubular member and chord.

It is yet a further object of the invention that such fastener be easily installed, so that on a production line, for example, the connection can be rapidly made by inexperienced workers who do not require significant training or possess extraordinary dexterity.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 5:
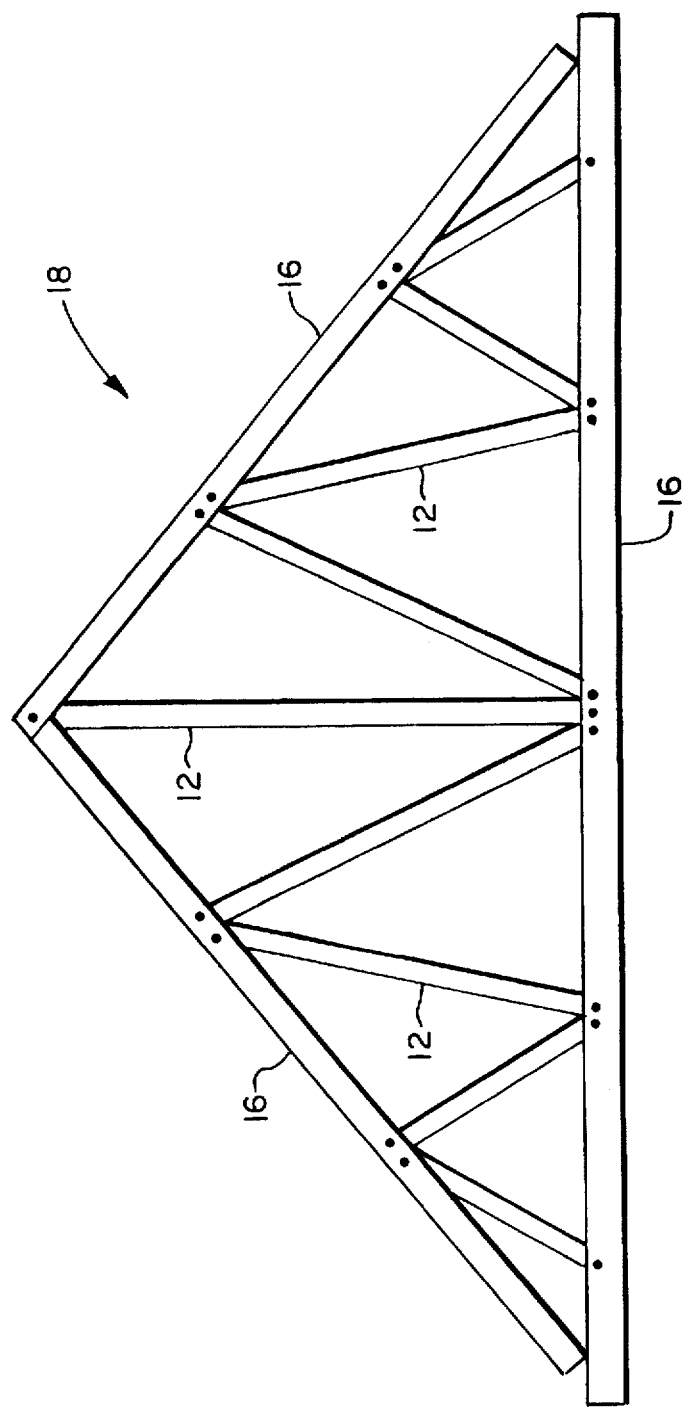
FIG. 5 is a front elevational view of a truss assembly having the double shear truss fastener of FIG. 1.
Figure 6:
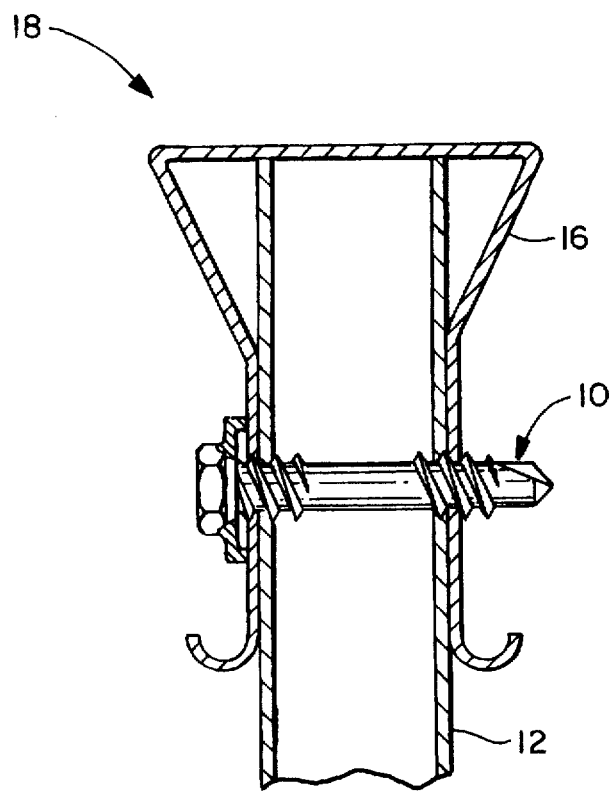
FIG. 6 is a side view, partly in section, of the tubular member, chord and fastener of FIG. 5.

With reference to the drawings wherein like numerals represent like parts throughout the several figures, a double shear truss fastener in accordance with the present invention is generally designated by the numeral 10. Fastener 10 is particularly adapted for joining low gauge steel members of a conventional metal truss frame assembly 18. In a preferred application, fastener 10 is a double shear screw which secures an end portion 14 of a rectangular tubular member 12 positioned inside the channel of a chord 16 to form one portion of a truss assembly 18 (FIGS. 5 and 6). The fastener 10 is particularly applicable for securely fastening together metal chords and metal tubes of truss frames, but is also readily applicable for use with fastening chords and tubes and similar structures composed of polymeric or other materials. Typically, the tubes are manufactured from 20 gauge steel and the chords are manufactured from 18, 20 or 22 gauge metal.

Figure 1:
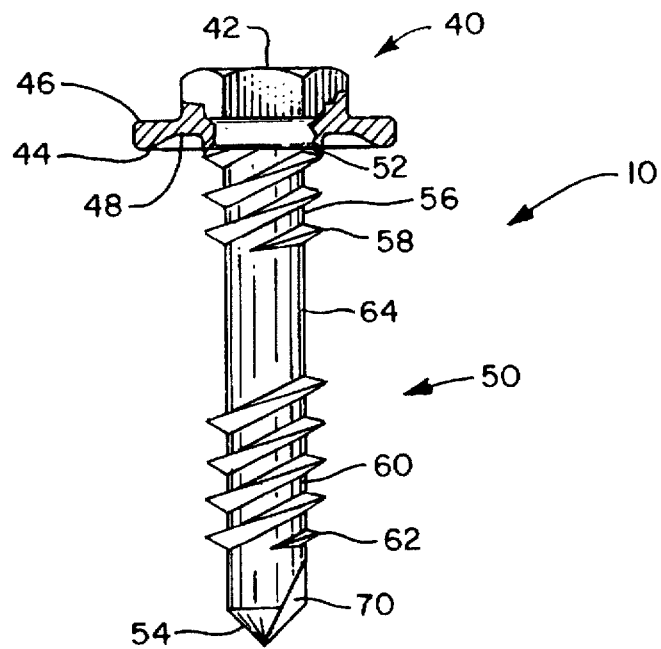
FIG. 1 is a side elevational view, partly in schematic, of a double shear truss fastener in accordance with the present invention.

With reference to FIG. 1, the fastener 10 includes a head 40 having a hexagonal-shaped upper side portion 42 that is receivable in a complementary driver of a pneumatic or electric torque gun (not illustrated). The head 40 has an underside portion 44 which includes an integral circumferential flange or washer 46. The underside of the head may further include an annular recess 48 to provide additional locking engagement and greater break away torque.

A shank 50 integrally extends at its proximal end 52 from the underside 44 of the head 40. The annular recess 48 surrounds the proximal end 52 of the shank 50. The shank 50 terminates in a tapered distal tip 54. The shank 50 comprises a proximal portion 56 that is traversed by a buttress thread 58, a distal portion 60 that is traversed by a buttress thread 62 that terminates in tapered fashion near the distal tip 54, and an unthreaded shaft portion 64 intermediate the proximal and distal portions 56, 60. The buttress threads 58, 62 function to provide a double shear threaded interface. Preferably, the outside diameter of the shaft portion 64 is equal to the root diameter of the distal and proximal portions 60, 56. Alternatively, the outside diameter of the shaft portion 64 may be smaller than the root diameter of the distal and proximal portions 60, 56.

Figure 2:
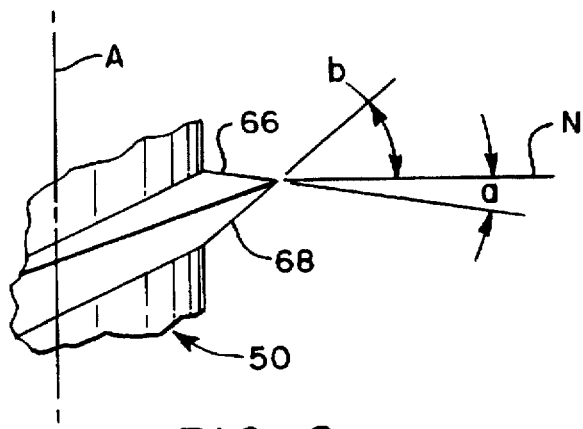
FIG. 2 is an enlarged fragmentary view, partly in schematic, of a portion of the thread of the fastener of FIG. 1.

With reference to FIG. 2, each buttress thread 58, 62 includes a support surface 66 and a driving surface 68. In a preferred form, the support surface 66 is oriented at an angle of approximately 10 degrees to a normal line N to the central axis A of the shank 50. Preferably, the angle a between normal line N and the support surface 66 is between 0 degrees and 15 degrees. The driving surface 68 is preferably oriented at an angle of approximately 35 degrees to a normal line N to the shank axis A. In preferred form, the angle of b between the normal line N and the driving surface 68 is between 25 degrees and 65 degrees.

The distal portion 60 of the shank 50 terminates in a pair of fluted slots 70 which are structured to provide a drill point 55 for self-drilling into the chord 16 and tubular member 12. The distal portion 60 may also be configured for self-piercing into the chord 16 and tubular member 12. The thread configuration provides for self-tapping. The slots 70 are oriented at an angle of approximately 26 degrees to the axis A of the shank 50.

Dimensions for one example of the fastener 10 that is manufactured from steel and heat treated are set forth in Table 1 below (dimensions in inches):

TABLE 1

| shank length | 1.187 |
| unthreaded shaft length (L$_3$) | .320 |
| distal portion length (L$_2$) | .362 |
| drill point length (L$_1$) | .270 |
| proximal portion length (L$_4$) | .250 |
| root diameter | .156 |
| thread diameter | .230 |
| tip diameter | .135 |
| washer diameter | .550 |

A coating of a sealant and/or an adhesive may be preapplied to the underside 42 of the head 40 and the top of the proximal portion 56, as shown in U.S. Pat. No. 5,304,023 which is incorporated by reference. The coating extends into the recess 48. The sealant/adhesive coating has properties and is applied to the fastener 10 so that the coating does not significantly increase the resistance to driving when the fastener 10 is installed and provides a good adhesion to the thread 62 when the adhesive is in an uncured state. The coating cures outside of the joint provided by the fastener 10 under the fastener head 40 and has good adhesion to painted surfaces and to threads 62 upon curing. The coating upon curing preferably provides an adhesive-type bond which is capable of curing in ambient temperatures.

Figure 3:
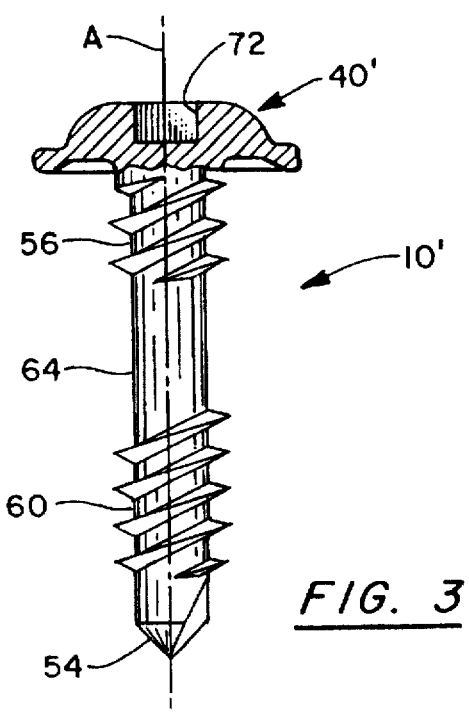
FIG. 3 is a side elevational view of a second embodiment of a double shear truss fastener in accordance with the present invention.

With reference to FIG. 3, a second embodiment of the fastener 10' has a round head 40' which has a socket 72 for receiving a complementary driver of a pneumatic or electric torque gun (not illustrated) and is otherwise similar to fastener 10.

Figure 4:
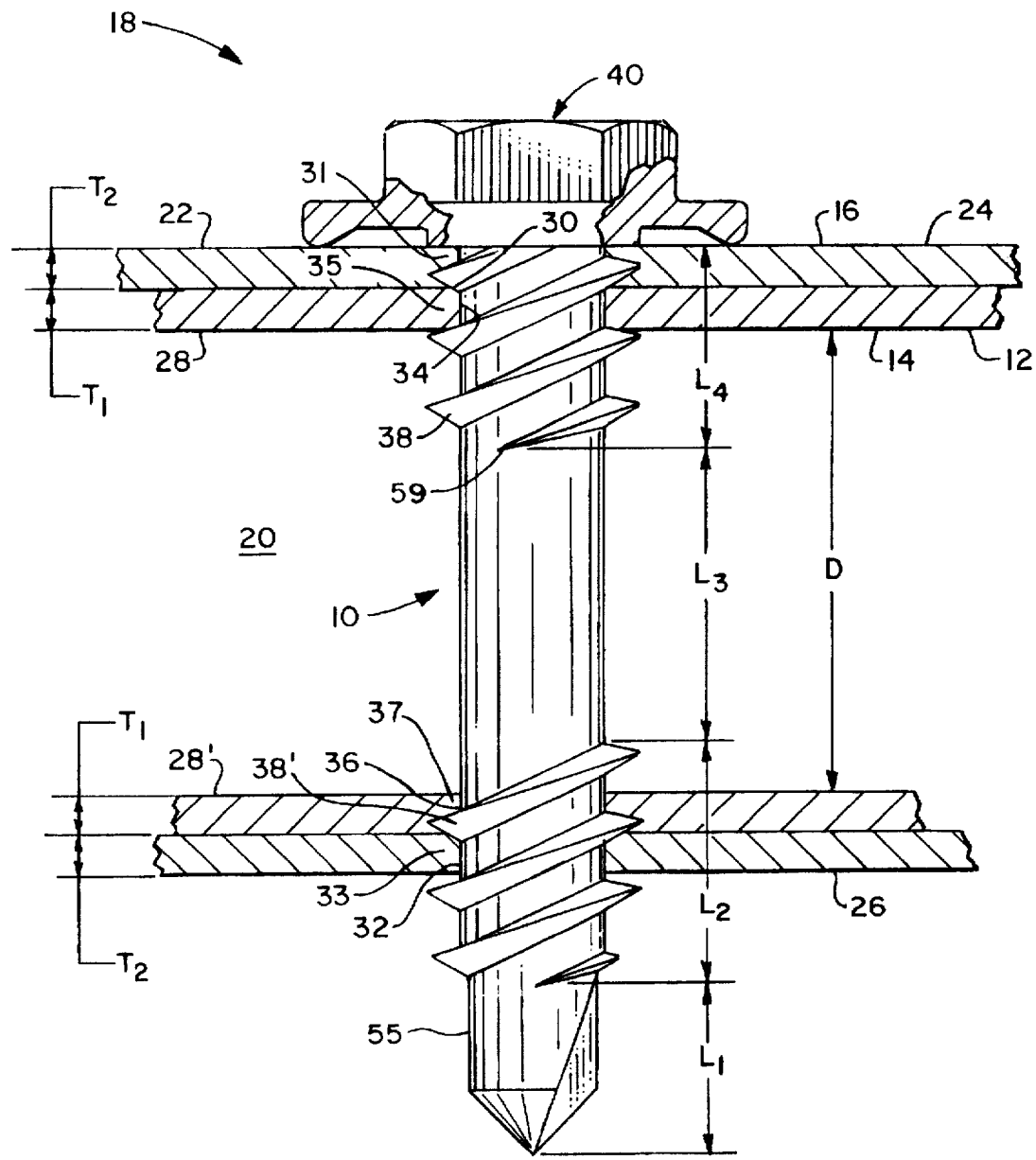
FIG. 4 is a side elevational view of the fastener of FIG. 1 illustrated in an installed configuration fastening a chord to a tube of a truss assembly, portions of which are illustrated in section.

With reference to FIG. 4, the installed fastener 10 is illustrated in an installed position for securing together a chord 16 and tubular member 12 in a double shear interface. It should be appreciated that the upper portions of the support surface 66 of each buttress thread 58, 62 provide a ledge for locking the chord 16 and tubular member 12. The truss 18 is partially assembled by inserting the end portion 14 of the tubular member 12 into the longitudinally extending channel 22 defined by the walls 24, 26 of the chord 16. The fastener 10 is installed by positioning the self-drilling point 55 adjacent the outside surface 25 of the first wall 24 of the chord 16. The fastener 10 is rotated such that the drill point 55 drills entrance holes 30, 34 in the first wall 24 of the chord 16 and the adjacent wall 28 of the tubular member 12. Following penetration by the drill point 55, the buttress thread 62 on the distal portion 60 of the shank 50 taps a complementary thread 38 in the walls of the entrance holes 30, 34, thereby threadably engaging the first wall 24 of the chord 16 and wall 28 of the tubular member 12 in first and third engagement zones 31, 35.

Continued rotation of the fastener 10 advances the distal tip 54 and the distal portion 60 of the shank 50 into the cavity 20 of the tubular member 12 by action of the buttress thread 62. The rate of advance is governed by the lead of the thread 62. Typically, the speed of rotation S$_1$ for most efficiently advancing the fastener 10 with the thread is higher than the speed of rotation S$_2$ for most efficiently drilling holes in the chord 16 and tubular member 12.

The length L$_2$ of the distal portion 60 of the shank 50 and the length L$_1$ of the drill point 55 are selected such that their total length L$_1$+L$_2$ is less than the inside spacing D of the tubular member 12. This ensures that the drill point 55 does not begin drilling exit holes 36, 32 in the opposite wall 28' of the tubular member 12 and the second wall 26 of the chord 16 while the buttress thread 62 on the distal portion 60 of the shank 50 engages the first and third engagement zones 31, 35.

The length L$_2$ of the distal portion 60 of the shank 50 and the length L$_3$ of the shaft portion 64 of the shank 50 are selected such that their total length L$_2$+L$_3$ is greater than the inside spacing D of the tubular member 12. This ensures that the distal end 59 of the buttress thread 58 on the proximal portion 56 of the shank 50 does not engage the outside surface 25 of the first wall 24 of the chord 16 until the drill point 55 has completed drilling exit holes 36, 32 in the opposite wall 28' of the tubular member 12 and the second wall 26 of the chord 16. Consequently, the advance rate of the fastener 10 is governed by the drilling action of the drill point 55 and not the buttress thread 58. The fastener 10 is therefore rotated at the more efficient slower drilling speed S2 while the drill point 55 drills the exit holes 32, 36 in the chord 16 and tubular member 12.

While the drill point 55 is drilling the exit holes 32, 36, the shaft portion 64 of the shank 50 is positioned in the entrance holes 34, 30 in the tubular member 12 and chord 16. The length L$_3$ of the shaft portion 64 of the shank 50 is selected such that L$_3$ is greater than the total of the thickness T$_1$ of the wall 28 of the tubular member 12 and the thickness T$_2$ of the first wall 24 of the chord 16. The diameter of the shaft portion 64 is equal to or smaller than the root diameter of the distal and proximal portions 60, 56 of the shank 50. Consequently, the shaft portion 64 rotates freely within the entrance holes 34, 30 as the drill point 55 drills the exit holes 36, 32 and does not strip the thread 38 formed in the wall of the entrance holes 34, 30.

Preferably, the lengths $L_2$, $L_4$ of the buttress thread 62, 58 on the distal and proximal portions 60, 56 are selected such that $L_2$ and $L_4$ are each greater than the total of the thickness $T_1$ of the wall 28 of the tubular member 12 and the thickness $T_2$ of the first wall 24 of the chord 16. This ensures that the support surface 66 and the driving surface 68 of the buttress thread 62, 58 engage the wall 28 of the tubular member 12 and the first wall 24 of the chord 16 to clamp the tubular member 12 to the chord 16. Alternatively, the length $L_4$ of the buttress thread 58 on the proximal portion 56 may be shorter than total of the thickness $T_1$ of the wall 28 of the tubular member 12 and the thickness $T_2$ of the first wall 24 of the chord 16, so long as a portion of the buttress thread 58 engages the wall 28 of the tubular member 12 and the underside portion 44 of the head 40 of the fastener 10 engages the outside wall 25 of the first wall 24.

After the drill point 55 has drilled the exit holes 32, 36, the buttress thread 58 on the proximal portion 56 of the shank 50 engages the tubular member 12 and chord 16 at the first and third engagement zones 31, 35. The buttress thread 62 on the distal portion 60 of the shank 50 taps a complementary thread 38' in the walls of the exit holes 32, 36, thereby threadably engaging the second wall 26 of the chord 16 and wall 28 of the tubular member 12 in second and fourth engagement zones 33, 37. Therefore, the fastener 10 fastens the tubular member 12 to the chord 16 at two spaced fastening engagement zones which provides a high degree of double shear fastening integrity.

Truss assemblies utilizing a single double shear fastener 10 such as illustrated in FIG. 6 and substantially identical truss assemblies utilizing two conventional number twelve (#12) screws (one at each side) in place of fastener 10 have been tested under tension to determine the joint yield point of the assemblies. The test results are provided in Table 2 below:

TABLE 2

| Fastener | Chord Thickness (gauge) | Yield Point (lbs.) |
| --- | --- | --- |
| 2 - #12 screws | 22 | 290 |
| 1 - double shear fastener | 22 | 718 |

It will be appreciated that a single double shear fastener 10 in accordance with the invention provides approximately 2.5 times the performance of two conventional screws. The yield point for a double shear fastener 10 for 20 and 18 gauge chord members was 774 and 924 lbs., respectively.

It will be appreciated that the head 40 of the fastener 10 alternately may be configured in a round head configuration having a slot for a driver blade or any other conventional fastener head configurations. It will be further appreciated that multiple fasteners 10 may be used to join a tubular member 12 to a chord 16 to provide additional holding strength.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A truss assembly comprising:
    a chord member having opposite first and second walls defining a longitudinally extending channel, said first and second walls having first and second openings, respectively, said second opening being substantially radially opposite said first opening;
    a tubular member disposed in said channel, said tubular member defining a longitudinally extending cavity and having third and fourth openings, said third and fourth openings being aligned with said first and second openings, respectively;
    fastener means comprising:
        head means comprising a top portion and an underside disposed adjacent said chord member; and
        shank means integrally extending from said underside through said first and third openings, said cavity, and said fourth and second openings, and terminating at a distal tip, said shank means comprising a proximal portion having a spiral buttress thread, a distal portion having a spiral buttress thread, an unthreaded shaft portion intermediate said proximal and distal portions, and self-drilling means adjacent said distal tip allowing self-drilling into said chord member and said tubular members;
    wherein said buttress thread of said proximal portion engages said chord member and said tubular member adjacent said first and third openings, said shaft portion is disposed in said cavity, and said buttress thread of said distal portion engages said chord member and said tubular member adjacent said second and fourth openings.

2. The assembly of claim 1 wherein said tubular member has an inside diameter, said distal portion and said shaft portion each have a length $L_2$, $L_3$, wherein the total of said length of said distal portion and said length of said shaft portion $L_2+L_3$ is greater than said diameter.

3. The assembly of claim 1 wherein said tubular member has an inside diameter, said self drilling means and said distal portion each have a length $L_1$, $L_2$, wherein the total of said length of said self drilling means and said distal portion $L_1+L_2$ is less than said diameter.

4. The assembly of claim 1 wherein said tubular member has a wall having a thickness $T_1$, said first wall of said chord member has a thickness $T_2$, and said shaft portion has a length $L_3$, wherein the length of said shaft portion $L_3$ is greater than the total of the thickness $T_1+T_2$.

5. The assembly of claim 1 wherein said tubular member has a wall having a thickness $T_1$, said first wall of said chord member has a thickness $T_2$, and said proximal portion has a length $L_4$, wherein the length of said proximal portion $L_4$ is greater than the total of the thickness $T_1+T_2$.

6. The assembly of claim 1 wherein said tubular member has a wall having a thickness $T_1$, said first wall of said chord member has a thickness $T_2$, and said distal portion has a length $L_2$, wherein the length of said distal portion $L_2$ is greater than the total of the thickness $T_1+T_2$.

7. The assembly of claim 1 wherein said head means further comprises recess means for defining a recess at said underside, said recess having a substantially annular shape.

8. The assembly of claim 1 wherein said buttress thread of said distal portion and said buttress thread of said proximal portion each define a first support surface which is oriented at an angle between 0 degrees and 15 degrees to a normal line to said axis of said shank means and a second surface which is inclined to said normal line at an angle between 25 and 65 degrees.

9. The assembly of claim 1 wherein said chord member and said tubular member are each composed of low gauge metal.

10. The assembly of claim 1 wherein said tubular member has an inside diameter, said self drilling means, said distal portion and said shaft portion each have a length $L_1$, $L_2$, $L_3$, wherein the total of said length of said distal portion and said length of said shaft portion $L_2+L_3$ is greater than said diameter and the total of said length of said self drilling means and said distal portion $L_1+L_2$ is less than said diameter.

11. The assembly of claim 10 wherein said tubular member has a wall having a thickness $T_1$, said first wall of said chord member has a thickness $T_2$, wherein the length of said shaft portion $L_3$ is greater than the total of the thickness $T_1+T_2$.

12. The assembly of claim 11 wherein the length of said distal portion $L_2$ is greater than the total of the thickness $T_1+T_2$.

13. The assembly of claim 12 wherein said proximal portion has a length $L_4$ which is greater than the total of the thickness $T_1+T_2$.

14. A method for fastening a first pair of substrates to a second pair of substrates in double shear relationship, the first and second pairs of substrates each having a spacing therebetween and the fastener having a head, a shank integrally extending from the head and terminating at a self-drilling distal tip and defining an axis thereof, the shank having a proximal portion including a spiral buttress thread, a distal portion including a spiral buttress thread, and an unthreaded shaft portion intermediate said proximal and distal portions, the method comprising the steps of:

inserting a portion of the second pair of substrates into the spacing of the first pair of substrates;

drilling a first opening in a one of the first pair of substrates and a one of the second pair of substrates with the distal tip of the fastener by rotating the fastener about the fastener axis;

engaging the buttress thread on the distal portion of the shank with the one of the first pair of substrates and the one of the second pair of substrates adjacent the first opening;

advancing the distal tip to a position adjacent the other of the second pair of substrates opposite the first opening by rotating the fastener about the fastener axis whereby the shaft portion of the shank is advanced to the first opening and the buttress thread on the distal portion of the shank is disengaged from the one of the first pair of substrates and the one of the second pair of substrates;

drilling a second opening in the other of the first pair of substrates and the other of the second pair of substrates with the distal tip of the fastener by rotating the fastener about the fastener axis; and engaging the buttress thread on the proximal and distal portions of the shank with the other of the first pair of substrates and the other of the second pair of substrates adjacent the first and second openings by rotating the fastener about the fastener axis.

15. The method of claim 14 wherein the fastener is rotated at a first speed during said steps of drilling a first and second openings.

16. The method of claim 15 wherein the fastener is rotated at a second speed during said step of advancing, wherein said second speed is faster than said first speed.

* * * * *